(12) United States Patent
Redekop

(10) Patent No.: US 9,408,338 B2
(45) Date of Patent: Aug. 9, 2016

(54) DISC MOUNTING ASSEMBLY FOR A VERTICAL TILLAGE IMPLEMENT

(71) Applicant: Johan Redekop, Winkler (CA)

(72) Inventor: Johan Redekop, Winkler (CA)

( * ) Notice: Subject to any disclaimer, the term of this patent is extended or adjusted under 35 U.S.C. 154(b) by 0 days.

(21) Appl. No.: 14/253,538

(22) Filed: Apr. 15, 2014

(65) Prior Publication Data

US 2015/0289434 A1   Oct. 15, 2015

(51) Int. Cl.
| | |
|---|---|
| *A01B 71/04* | (2006.01) |
| *A01B 15/00* | (2006.01) |
| *A01B 5/00* | (2006.01) |
| *A01B 21/08* | (2006.01) |
| *A01B 71/08* | (2006.01) |

(52) U.S. Cl.
CPC . *A01B 15/00* (2013.01); *A01B 5/00* (2013.01); *A01B 21/086* (2013.01); *A01B 71/04* (2013.01); *A01B 71/08* (2013.01)

(58) Field of Classification Search
CPC ................................ A01B 23/06; A01B 71/04
USPC .................................................. 172/604, 762
See application file for complete search history.

(56) References Cited

U.S. PATENT DOCUMENTS

| | | | | |
|---|---|---|---|---|
| 657,204 | A * | 9/1900 | Poole | 384/460 |
| 2,003,831 | A * | 6/1935 | Glaves | 172/603 |
| 2,274,438 | A * | 2/1942 | Stoner | 172/603 |
| 2,849,261 | A * | 8/1958 | Bjerre | 384/460 |
| 3,101,793 | A * | 8/1963 | Brown et al. | 172/609 |
| 3,980,355 | A * | 9/1976 | Gilles | 384/460 |
| 4,196,779 | A * | 4/1980 | Steilen | 172/604 |
| 5,397,187 | A * | 3/1995 | Cachinero et al. | 384/460 |
| 7,073,949 | B2 * | 7/2006 | Ruckle et al. | 384/460 |
| 2012/0312569 | A1 | 12/2012 | Redekop | |

* cited by examiner

*Primary Examiner* — Thomas B Will
*Assistant Examiner* — Joel F. Mitchell
(74) *Attorney, Agent, or Firm* — Ryan W. Dupuis; Kyle R. Satterthwaite; Ade & Company Inc.

(57) ABSTRACT

In a disc assembly for supporting a ground engaging disc on a respective support arm of a vertical tillage implement, the disc supporting hub has an annular body rotatably supported on a shaft. The outer end of the annular body is enclosed by a cap and the inner end of the annular body is enclosed by an end plate fixed on the shaft relative to which the annular body is rotated. First and second annular flanges on the inner end of the annular body receive a tongue portion of the end plate therein so as to define a sinuous, narrow clearance gap where the annular body of the hub and the end plate of the shaft are in a non-contacting, rotatable relationship with one another. The sinuous, narrow clearance gap minimizes penetration of soil and residue therethrough to the interior of the hub where bearings are located.

14 Claims, 4 Drawing Sheets

`US 9,408,338 B2`

DISC MOUNTING ASSEMBLY FOR A VERTICAL TILLAGE IMPLEMENT

FIELD OF THE INVENTION

The present invention relates to agricultural implements for vertical tillage including a plurality of disc supporting tillage units supported on a main frame, and more particularly the present invention relates to a hub and shaft arrangement for rotatably supporting a ground engaging disc on the disc supporting arm of a respective one of the tillage units.

BACKGROUND

As described in U.S. Patent Application Publication No. US 2012/0312569 by Redekop, in one known form of conservation tillage, the soil is minimally disturbed prior to planting in order to allow air to penetrate the mat of crop residue. This technique is variously known as minimum tillage, residue management, soil aeration or seedbed aeration. A farm implement, sometimes known as a vertical tillage implement, is used to cut the crop residue and penetrate a short distance into the surface of the soil while lifting the soil vertically to permit access of air to the soil.

A known construction of a vertical tillage implement comprises a main frame supporting a plurality of tillage units thereon in which each tillage unit comprises a disc supporting arm which is resiliently mounted relative to the main frame. A disc assembly is then mounted on the trailing end of the disc supporting arm in the form for a shaft and a hub which rotatably supports a ground engaging disc on the shaft.

During use of the vertical tillage implement, the soil is fractured in such a manner that a considerable amount of side flowing soil and residue movement results. Maintenance of prior art hub and shaft arrangements due to penetration of soil and residue into the bearing thereof is thus a known concern.

SUMMARY OF THE INVENTION

According to one aspect of the invention there is provided a disc assembly for use with a vertical tillage implement having a main frame supporting a plurality of tillage units thereon in which each tillage unit includes a disc supporting arm mounted on the main frame, the disc assembly comprising:

a shaft arranged to be mounted on the disc supporting arm of a respective one of the tillage units;
a hub supported on the shaft such that the hub is rotatable about a longitudinal axis of the shaft, the hub including:
an annular body portion supported concentrically about the shaft to extend in an axial direction between an inner end and an opposing outer end;
a disc mounting portion provided externally on the annular body portion so as to be arranged to mount a ground engaging disc on the hub;
a cap portion arranged to enclose the outer end of the annular body portion;
a first annular flange portion oriented circumferentially about the shaft and protruding in the axial direction from the inner end of the annular body portion; and
a second annular flange portion oriented circumferentially about the shaft and portion protruding in the axial direction from the inner end of the annular body portion;
the second annular flange portion being smaller in circumference than the first annular flange portion so as to define a groove between the first and second annular flange portions which extends circumferentially about the shaft at the inner end of the annular body portion;
an end plate mounted fixedly on the shaft so as to substantially enclose the inner end of the annular body portion, the end plate including an annular tongue portion protruding axially from an interior side of the end plate so as to be matingly received within the annular groove between the first and second annular flange portions for relative rotation therebetween.

The resulting sinuous path between the tongue portion of the end plate and the pair of annular flange portions of the hub has been found to considerably minimize penetration of soil and residue through the rotatably interface of the hub to the interior of the hub where bearings are located. Accordingly this has the advantage of minimizing maintenance required with regard to the bearings which rotatably support the hub and disc on the shaft of each disc assembly on a vertical tillage implement.

Preferably there is provided a generally U-shaped clearance gap between the annular tongue portion and the annular flange portions such that the annular body portion and the end plate do not directly contact one another.

A first radial gap portion between the tongue portion and the first annular flange portion preferably increases in radial dimension in the axial direction towards an exterior of the annular body portion from a first end to a second end of the first radial gap. The first radial gap portion may be less than 0.050 inches in dimension along a full length in the axial direction between the first end and the second end thereof. More preferably, the first radial gap portion varies from a dimension from 0.015 inches to 0.030 inches.

A first end gap portion in the axial direction between an inner end of the tongue portion and the inner end of the annular body portion in proximity to the first end of the first radial gap, preferably has a dimension which is less than the second end of the first radial gap. More particularly the first end gap may be less than 0.050 inches in dimension and is preferably approximately 0.015 inches.

Preferably the first annular flange portion is substantially flush with an exterior side of the end plate.

A second radial gap between the tongue portion and the second annular flange portion preferably also increases in radial dimension in the axial direction towards an interior of the annular body portion from a first end to a second end of the second radial gap. The second radial gap is preferably less than 0.05 inches in dimension along a full length in the axial direction between the first end and the second end thereof. More preferably the first radial gap portion varies in dimension from 0.015 inches to 0.030 inches.

Preferably a second end gap is provided in the axial direction between a free end of the second annular flange portion and the interior side of the end plate which has a dimension which is less than 0.050 inches, and more particularly is approximately 0.030 inches.

The interior side of the end plate may further include a shoulder portion protruding axially inwardly at a location which is radially inwardly from the tongue portion and which is in close proximity to the second annular flange portion so as to be arranged to define a generally S-shaped clearance gap between the annular flange portions of the annular body portion and the tongue portion and the shoulder portion of the end plate. Preferably the annular body portion and the end plate remain in a non-contacting relationship along a length of the S-shaped clearance gap between an interior and an exterior of the annular body portion.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
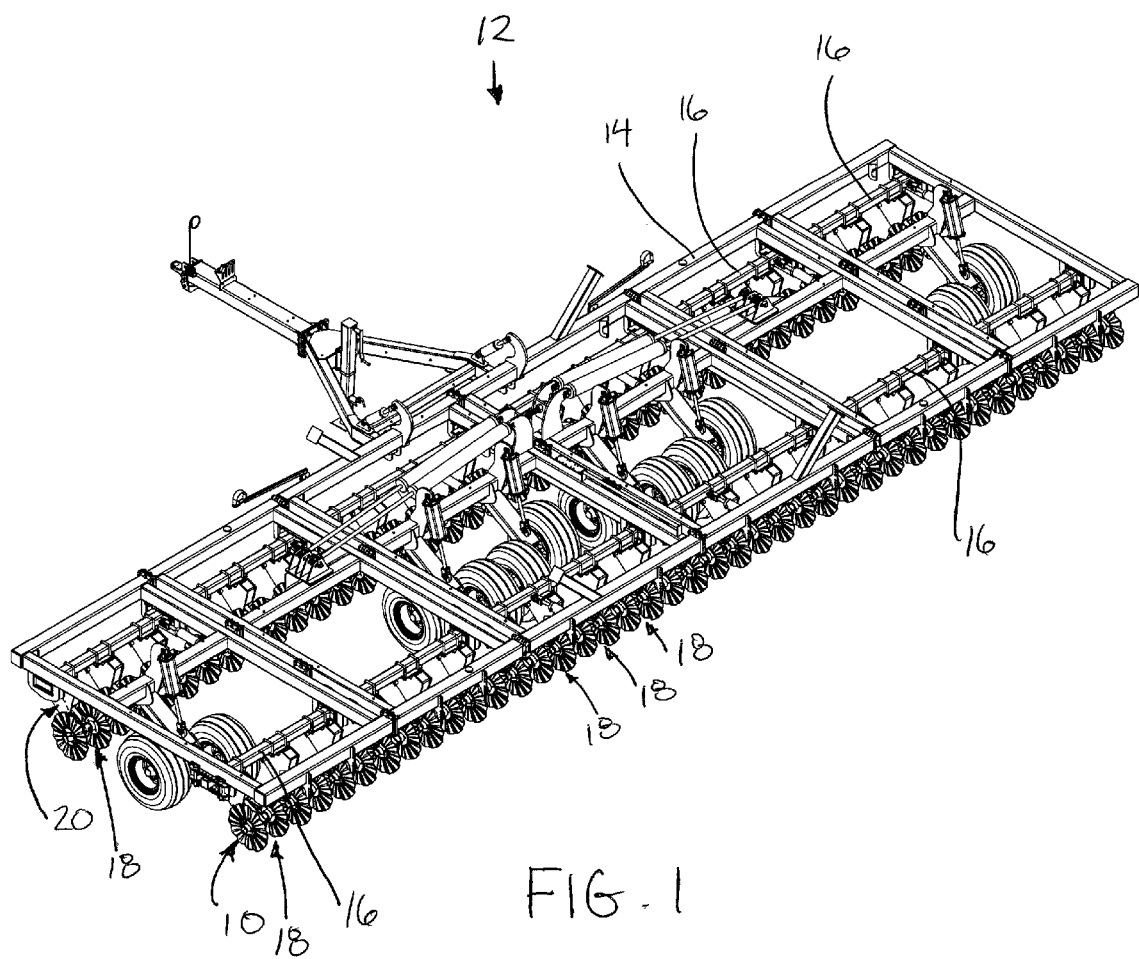
FIG. 1 is a perspective view of an example of a vertical tillage implement upon which the disc assembly of the present invention is installed.

Referring to the accompanying figures, there is illustrated a disc assembly generally indicated by reference numeral 10. The disc assembly 10 is suited for use with a vertical tillage implement 12 of the type shown in FIG. 1.

A typical vertical tillage implement 12 upon which the disc assembly is installed includes a main frame 14 arranged for connection to a towing vehicle for movement across an agricultural field in a forward working direction. One or more tool bars 16 are mounted on the main frame to span horizontally and transversely to the forward working direction. A plurality of tillage units 18 are mounted on each tool bar. Each tillage unit includes a disc supporting arm 20 which is supported on the tool bar by a respective resilient connection at the front end thereof such that the support arm trails downwardly and rearwardly from the front end to a rear end supporting respective disc assemblies 10 thereon. A spring element biases the disc supporting arm 20 downwardly for engagement of the disc assemblies at the rear end thereof with the ground while permitting upward deflection of the disc assemblies when obstacles are encountered.

Figure 2:
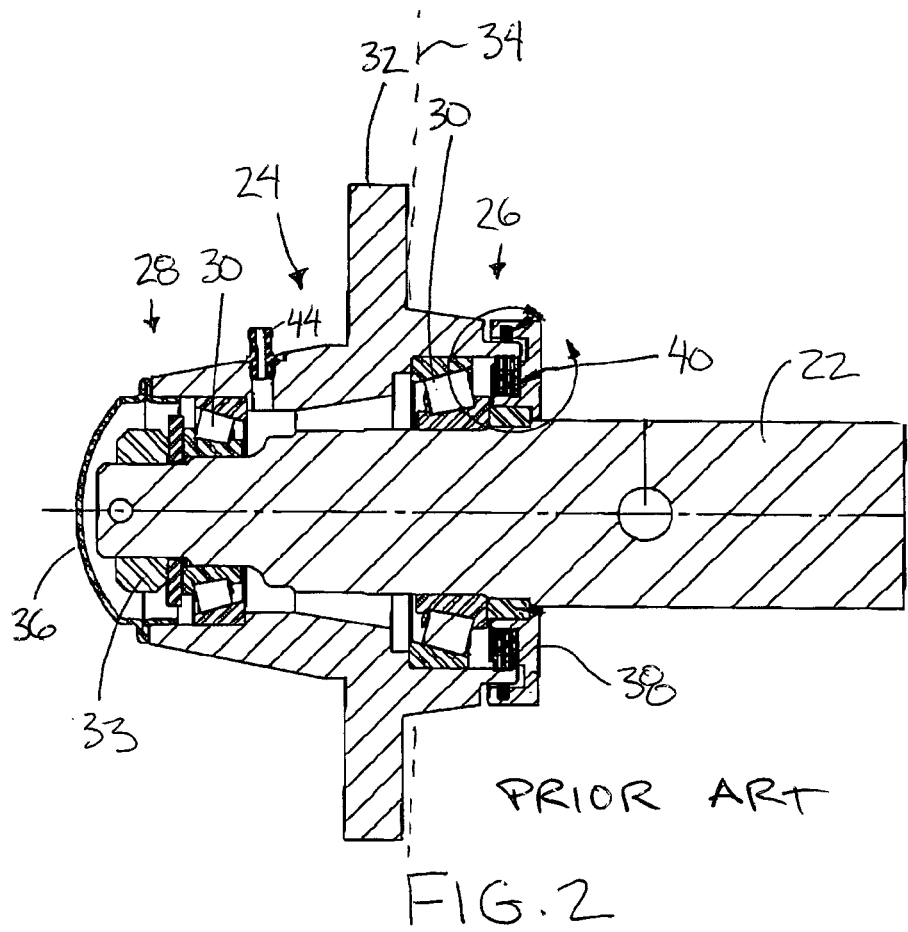
FIG. 2 is a sectional view of a prior art disc assembly for a vertical tillage implement.
Figure 3:
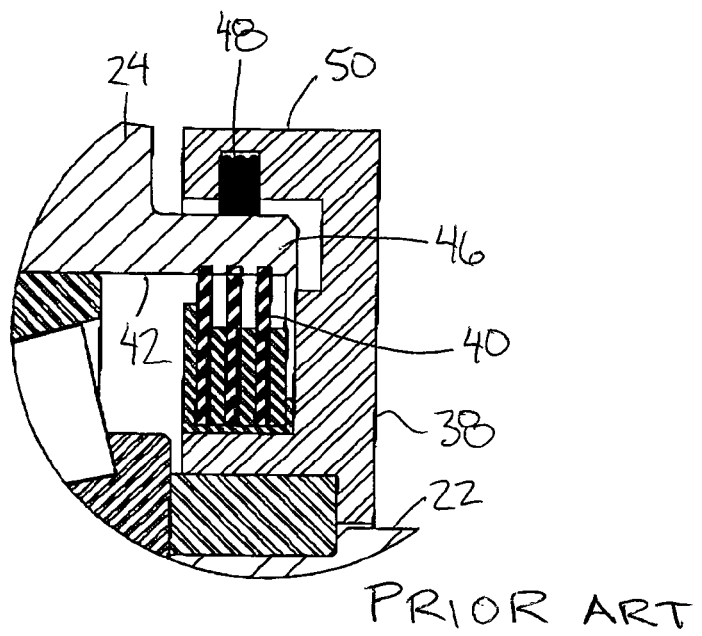
FIG. 3 is a sectional view of an enlarged portion of the prior art disc assembly according to FIG. 2.
Figure 4:
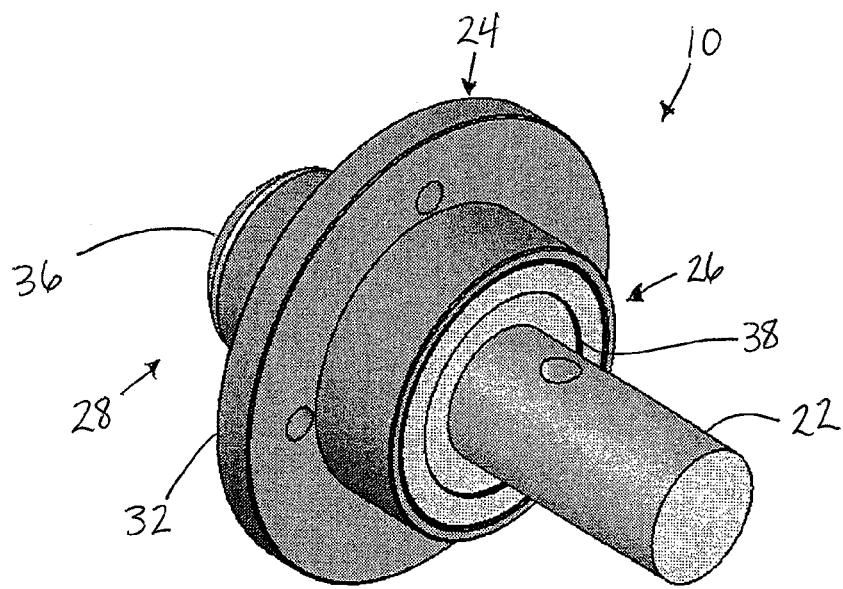
FIG. 4 is a perspective view of the disc assembly according to the present invention.
Figure 5:
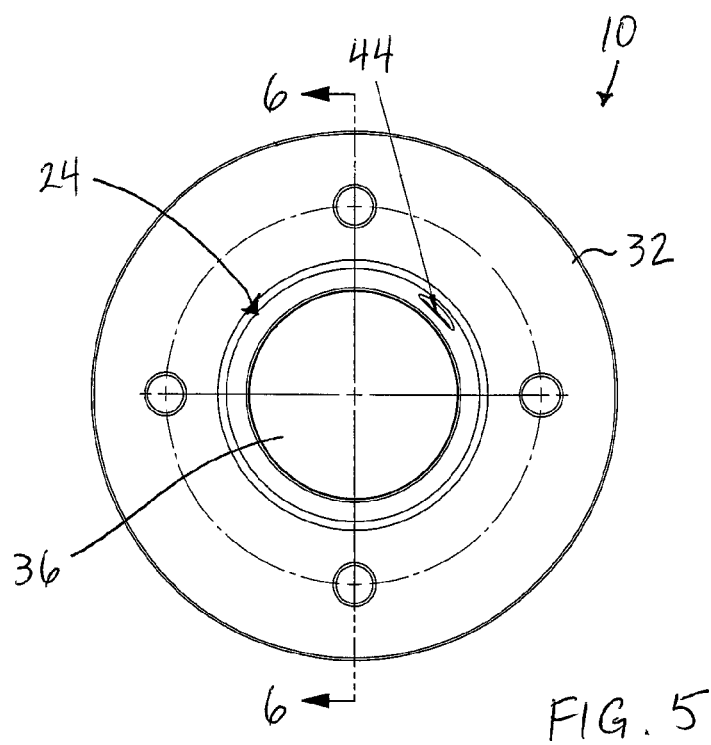
FIG. 5 is an end elevational view of the disc assembly according to FIG. 3.
Figure 6:
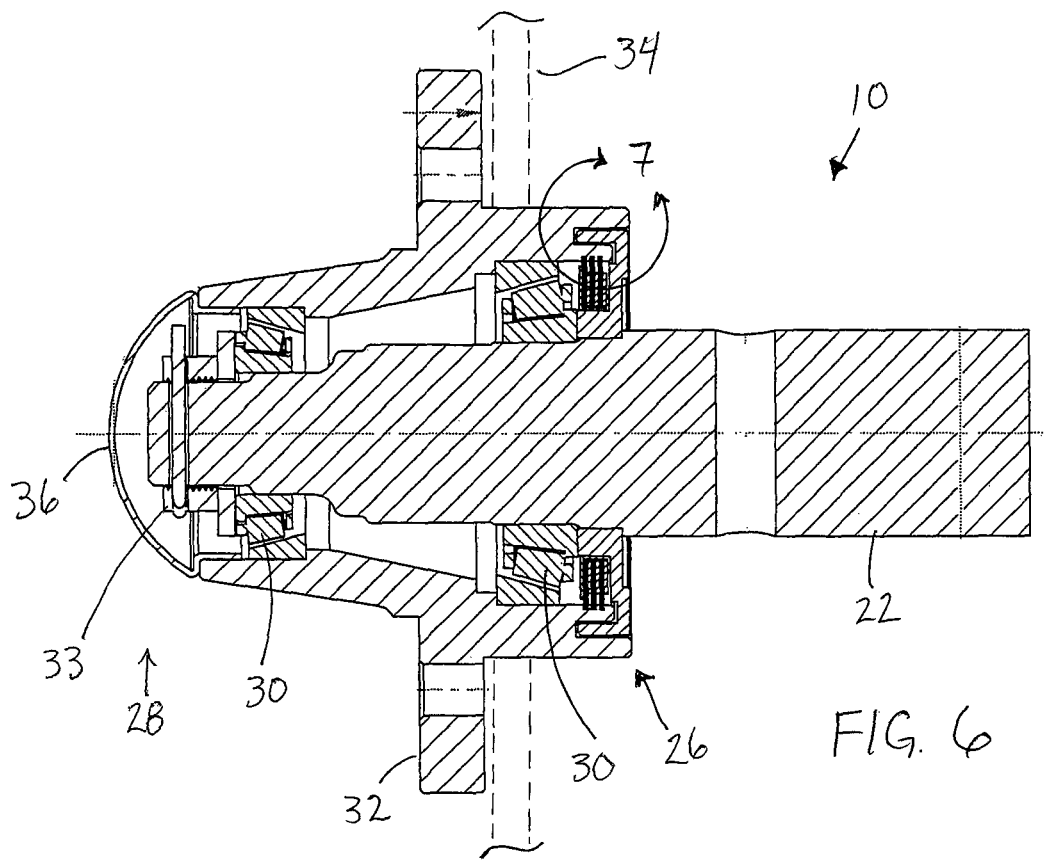
FIG. 6 is a sectional view along the line 6-6 of FIG. 5.
Figure 7:
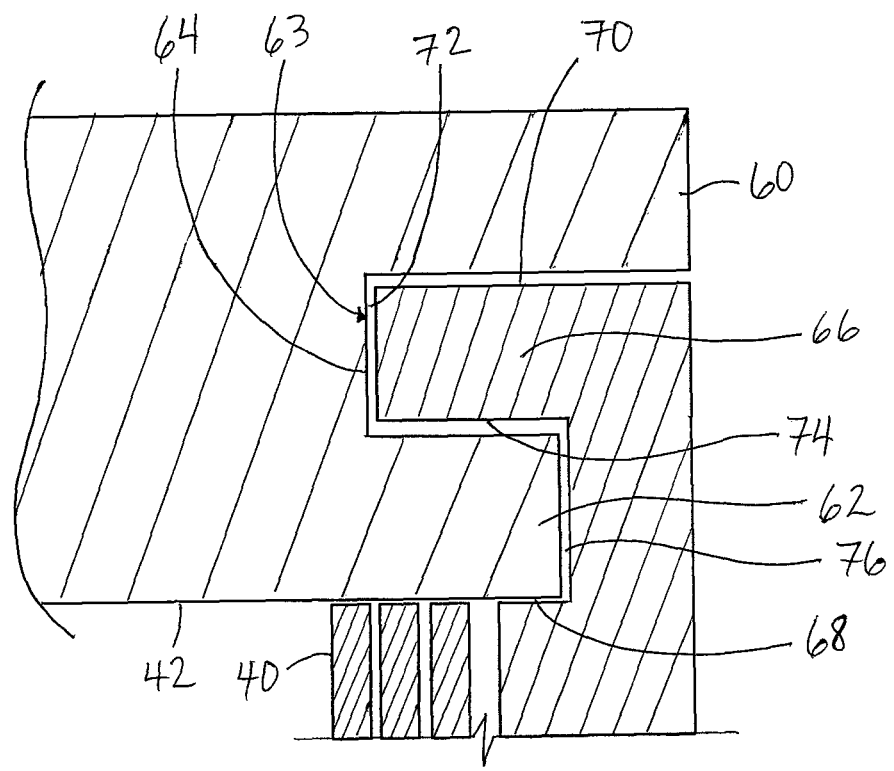
FIG. 7 is an enlarged portion of the section view according to FIG. 6.

Each disc assembly 10 of the present invention has various features in common with a prior art disc assembly shown in FIG. 2. In particular, each disc assembly includes a shaft 22 arranged to be mounted in fixed arrangement to the rear end of the respective disc supporting arm 20. A hub 24 is rotatably supported on the shaft about a longitudinal axis of the shaft which is oriented generally horizontally and transversely to the forward working direction. The hub 24 comprises an annular body portion extending generally in the axial direction from an inner end 26 to an opposing outer end 28.

An interior diameter of the annular body is larger than the outer diameter of the shaft received therethrough to provide radial space therebetween locating two bearings 30 at axially spaced positions along the shaft. The two bearings comprise an annular arrangement of bearings mounted at an incline to the axial direction in axially opposing arrangements relative to one another to provide radial and axial support in both directions to the hub relative to the shaft. The bearings are arranged in proximity to the inner and outer ends of the annular body portion respectively.

A disc mounting portion 32 is mounted externally on the annular body portion in the form of a flange extending about the circumference of the body and projecting radially outward therefrom perpendicularly to the axis of rotation. Bolt holes in the flange defining the disc mounting portion permit a ground engaging disc 34 to be fixed thereon such that the disc is rotatable with the hub relative to the shaft.

A retainer nut 33 is fastened at the outer end of the shaft 22 to retain the bearings 30 at respective positions in the longitudinal direction of the shaft.

A cap member 36 is mounted in fixed relation across the outer end of the annular body portion to fully enclose the outer end of the annular body portion. The outer end of the shaft is thus fully received within the interior of the annular body portion and cap member.

An end plate 38 is mounted in fixed relation to the shaft adjacent the inner end of the annular body portion such that the end plate is arranged to span and substantially enclose the inner end of the annular body portion. The end plate generally comprises a circular body having an exterior side oriented generally perpendicularly to the axial direction. A plurality of wiper seals 40 are supported at the interior side of the end plate 38 such that the wiper seals extend radially outward from an interior mounted end to an outer end in rotating contact with a corresponding inner surface 42 of the annular body portion adjacent the inner end thereof.

A suitable grease nipple 44 communicates through the wall of the annular body at an intermediate location in the axial direction between the disc mounting portion and the outer end of the body. At the interior of the body, the grease nipple communicates with the longitudinal space between the two pairs of bearings 30 to permit grease to fill the open interior of the body between the inner and outer ends thereof locating the bearings therein.

The disc assembly 10 of the present invention remains distinguished from the prior art by the mating configuration between the inner end of the annular body portion and the end plate. In one example of a prior art configuration shown in FIG. 2, the inner end of the annular body portion terminates at a single collar shaped structure 46 defining the inner surface 42 against which the wiper seals are rotatably engaged at the interior side and defining an outer surface in rotatable engagement with an O-ring seal 48. In this instance, the end plate 38 is provided with a collar portion 50 having an interior diameter which is greater than the outer diameter of the collar structure 46 to permit the collar portion 50 to overlap the collar structure 46. An annular groove in the interior surface of the collar portion 50 provides a mounting location for the O-ring 48. The seam between the inner end of the annular body portion and the end plate terminates at the exterior of the hub in a radial orientation. A large clearance gap is provided between the annular body portion and the end plate such that the O-ring seal 48 in direct contact therebetween provides the primary resistance to soil penetration through the seam.

The disc assembly 10 of the present invention as shown in FIGS. 4 through 7 remains distinguished from the prior art in the configuration of the inner end 26 of the annular body portion and in the configuration of the end plate 38. More particularly, the annular body portion in this instance comprises a first annular flange 60 which is integral with the annular body portion and which is oriented to extend about a full circumference of the shaft concentrically therewith. The first annular flange is flush with the outer diameter of the annular body portion at the outer side thereof and extends in the axial direction beyond the inner end of the body to a free end which is flush with the exterior side of the end plate 38.

The inner end of the annular body portion also includes a second flange 62 which is integral with the body to extend circumferentially about the shaft, concentrically therewith. The second annular flange 62 has an outer diameter which is less than the inner diameter of the first annular flange and an inner diameter which is substantially flush with the adjacent inner surface of the annular body portion.

The radial distance between the first and second annular flanges defines an annular groove extending generally axially from a terminal end surface 64 joined between the first and second annular flanges to an opposing end which receives a portion of the end plate therethrough as described in further detail below. The end surface 64 defines the inner end of the annular body portion from which the first and second annular flanges project.

The outer diameter of the end plate 38 in this instance corresponds approximately to the inner diameter of the first annular flange 60 and supports an annular tongue portion 66 thereon. The tongue 66 comprises an annular flange extending about a full circumference of the shaft and which projects in an axial direction from an interior side of the end plate to extend into the annular groove 63.

The end plate 38 also includes a shoulder 68 located at the interior side of the end plate at a location which is radially inward from the tongue 66. The shoulder 68 defines a surface projecting in the axial direction about a full circumference of the shaft in close proximity to the inner surface of the second annular flange 62. The wiper seals 40 are mounted further towards the interior of the annular body portion in the axial direction relative to the shoulder 68.

In the arrangement described above, the tongue 66 received within the annular groove 63 between the first and second annular flanges defines a generally U-shaped clearance gap. The clearance gap is continuous about the free end of the second annular flange due to the close proximity to the shoulder 68 such that the overall seam between the inner end of the annular body portion and the end plate is generally S-shaped in profile from an exterior opening which faces in the axial direction at the periphery of the end plate, about the tongue 66, and about the second annular flange 62 to the opposing end which is open in an axial direction towards the interior of the annular body portion. The overall dimension of the gap between the annular body portion and the end plate may be generally in a range between 0.010 inches and 0.050 inches. In the illustrated embodiment, the gap ranges between 0.015 inches and 0.030 inches. The gap remains unobstructed to provide a non-contacting mating connection along a full length of the gap from the exterior to the interior of the annular body portion.

The overall gap includes a first radial gap portion 70 spanning in the axial direction between a first end at the free end of the tongue corresponding to the end surface 64 of the annular groove to an opposing second end at the exterior side of the end plate 38. The dimension of the gap in the radial direction widens from the first end having a dimension of 0.015 inches to the second end having a dimension of 0.030 inches.

The overall gap further includes a first end gap portion 72 which is a gap in the axial direction but which spans radially across the free end of the tongue 66. The dimension of the gap in the axial direction between the annular body portion and the end plate is 0.015 inches.

The overall gap also includes a second radial gap portion 74 which spans in an axial direction from a first end in proximity to the free end of the tongue and the end surface 64 of the annular groove to an opposing second end at the interior side of the end plate 38. The dimension of the gap in the radial direction is similar to the first radial gap portion 70 in that it widens from a dimension of 0.015 inches at the first end to a dimension of 0.030 inches at the second end.

Furthermore, the overall gap includes a second end gap portion 76 which is a gap in the axial direction between the free end of the second annular flange 62 and the corresponding portion at the interior side of the end plate 38. The dimension of the gap in the axial direction is 0.030 inches.

The small clearance dimension along the full length of the gap provides minimal opportunity for disturbed soil and debris to enter the gap into the interior of the annular hub portion where the bearings are located. Furthermore, by orienting the exterior opening of the gap to be directed in an axial direction rather than the radial arrangement of the prior art, disturbed soil is less likely to be forced radially inwardly through the seam to the interior of the hub portion. By further arranging the first radial gap portion 70 to become wider in radial dimension towards the exterior open end, any debris entering the gap is more likely to be encouraged to navigate to the exterior towards the widening opening and thus be restricted from further penetration by the narrowing gap dimension towards the interior of the annular body portion.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A disc assembly for use with a vertical tillage implement having a main frame supporting a plurality of tillage units thereon in which each tillage unit includes a disc supporting arm mounted on the main frame, the disc assembly comprising:
   a shaft arranged to be mounted on the disc supporting arm of a respective one of the tillage units;
   a hub supported on the shaft such that the hub is rotatable about a longitudinal axis of the shaft, the hub including:
      an annular body portion supported concentrically about the shaft to extend in an axial direction between an inner end and an opposing outer end;
      a disc mounting portion provided externally on the annular body portion so as to be arranged to mount a ground engaging disc on the hub;
      a cap portion arranged to enclose the outer end of the annular body portion;
      a first annular flange portion oriented circumferentially about the shaft and protruding in the axial direction from the inner end of the annular body portion; and
      a second annular flange portion oriented circumferentially about the shaft and the second annular flange portion and protruding in the axial direction from the inner end of the annular body portion;
      the second annular flange portion being smaller in circumference than the first annular flange portion so as to define a groove between the first and second annular flange portions which extends circumferentially about the shaft at the inner end of the annular body portion;
   an end plate mounted fixedly on the shaft so as to substantially enclose the inner end of the annular body portion, the end plate including an annular tongue portion protruding axially from an interior side of the end plate so as to be matingly received within the annular groove between the first and second annular flange portions for relative rotation therebetween;
   wherein there is provided a clearance gap between the annular tongue portion and the annular flange portions, that includes a U-shaped portion about the annular tongue portion, in which the annular tongue portion and the annular flange portions remain open and unobstructed therebetween along a full length of the clearance gap in axial and radial directions of the clearance gap from an exterior opening at an outer end of the clearance gap to an inner end of the gap which is open to a hollow interior of the annular body portion.

2. The assembly according to claim 1 wherein there is provided a first radial gap between the annular tongue portion and the first annular flange portion which increases in radial dimension in the axial direction towards an exterior of the annular body portion from a first end to a second end of the first radial gap.

3. The assembly according to claim 2 wherein the first radial gap is less than 0.05 inches in dimension along a full length in the axial direction between the first end and the second end of the first radial gap.

4. The assembly according to claim 2 wherein there is provided a first end gap in the axial direction between an inner end of the annular tongue portion and the inner end of the annular body portion in proximity to the first end of the first radial gap, the first end gap having a dimension which is less than the second end of the first radial gap.

5. The assembly according to claim 4 wherein the first end gap is less than 0.05 inches in dimension.

6. The assembly according to claim 1 wherein the first annular flange portion is substantially flush with an exterior side of the end plate.

7. The assembly according to claim 1 wherein there is provided a second radial gap between the annular tongue portion and the second annular flange portion which increases in radial dimension in the axial direction towards an interior of the annular body portion from a first end to a second end of the second radial gap.

8. The assembly according to claim 7 wherein the second radial gap is less than 0.05 inches in dimension along a full length in the axial direction between the first end and the second end of the second radial gap.

9. The assembly according to claim 1 wherein there is provided a second end gap in the axial direction between a free end of the second annular flange portion and the interior side of the end plate.

10. The assembly according to claim 9 wherein the second end gap is less than 0.05 inches in dimension.

11. The assembly according to claim 9 wherein the interior side of the end plate includes a shoulder portion protruding axially inwardly at a location which is radially inwardly from the annular tongue portion and which is in close proximity to the second annular flange portion so as to be arranged to define a generally S-shaped clearance gap between the annular flange portions of the annular body portion and the annular tongue portion and the shoulder portion of the end plate.

12. The assembly according to claim 11 wherein the annular body portion and the end plate remain in a non-contacting relationship along a length of the S-shaped clearance gap between an interior and an exterior of the annular body portion.

13. A disc assembly for use with a vertical tillage implement having a main frame supporting a plurality of tillage units thereon in which each tillage unit includes a disc supporting arm mounted on the main frame, the disc assembly comprising:
 a shaft arranged to be mounted on the disc supporting arm of a respective one of the tillage units;
 a hub supported on the shaft such that the hub is rotatable about a longitudinal axis of the shaft, the hub including:
  an annular body portion supported concentrically about the shaft to extend in an axial direction between an inner end and an opposing outer end;
  a disc mounting portion provided externally on the annular body portion so as to be arranged to mount a ground engaging disc on the hub;
  a cap portion arranged to enclose the outer end of the annular body portion;
  a first annular flange portion oriented circumferentially about the shaft and protruding in the axial direction from the inner end of the annular body portion; and
  a second annular flange portion oriented circumferentially about the shaft and the second annular flange portion and protruding in the axial direction from the inner end of the annular body portion;
  the second annular flange portion being smaller in circumference than the first annular flange portion so as to define a groove between the first and second annular flange portions which extends circumferentially about the shaft at the inner end of the annular body portion;
 an end plate mounted fixedly on the shaft so as to substantially enclose the inner end of the annular body portion, the end plate including an annular tongue portion protruding axially from an interior side of the end plate so as to be matingly received within the annular groove between the first and second annular flange portions for relative rotation therebetween;
 wherein there is provided a first radial gap between the annular tongue portion and the first annular flange portion which increases in radial dimension in the axial direction towards an exterior of the annular body portion along a full length of the first radial gap from a first end of the first radial gap at an inner end of the annular tongue portion to a second end of the first radial gap which is open in an axial direction to an exterior of the disc assembly; and
 wherein the first radial gap is less than 0.05 inches in radial dimension along said full length in the axial direction between the first end and the second end of the radial gap.

14. A disc assembly for use with a vertical tillage implement having a main frame supporting a plurality of tillage units thereon in which each tillage unit includes a disc supporting arm mounted on the main frame, the disc assembly comprising:
 a shaft arranged to be mounted on the disc supporting arm of a respective one of the tillage units;
 a hub supported on the shaft such that the hub is rotatable about a longitudinal axis of the shaft, the hub including:
  an annular body portion supported concentrically about the shaft to extend in an axial direction between an inner end and an opposing outer end;
  a disc mounting portion provided externally on the annular body portion so as to be arranged to mount a ground engaging disc on the hub;
  a cap portion arranged to enclose the outer end of the annular body portion;
  a first annular flange portion oriented circumferentially about the shaft and protruding in the axial direction from the inner end of the annular body portion; and
  a second annular flange portion oriented circumferentially about the shaft and the second annular flange portion and protruding in the axial direction from the inner end of the annular body portion;
  the second annular flange portion being smaller in circumference than the first annular flange portion so as to define a groove between the first and second annular flange portions which extends circumferentially about the shaft at the inner end of the annular body portion;

an end plate mounted fixedly on the shaft so as to substantially enclose the inner end of the annular body portion, the end plate including an annular tongue portion protruding axially from an interior side of the end plate so as to be matingly received within the annular groove between the first and second annular flange portions for relative rotation therebetween;

wherein the interior side of the end plate includes a shoulder portion protruding axially inwardly at a location which is radially inwardly from the annular tongue portion and which is in close proximity to the second annular flange portion so as to be arranged to define a generally S-shaped clearance gap between the annular flange portions of the annular body portion and the annular tongue portion and the shoulder portion of the end plate; and wherein the annular body portion and the end plate remain open therebetween along a full length of the S-shaped clearance gap between an interior and an exterior of the annular body portion.

* * * * *